US005408287A

United States Patent [19]
Winegarden et al.

[11] Patent Number: 5,408,287
[45] Date of Patent: Apr. 18, 1995

[54] SWITCHABLE CAMERA FUNCTIONS FOR RIGHT-HAND AND LEFT-HAND USER ACTUATED BUTTONS

[75] Inventors: Ronald D. Winegarden, Rochester; Dwight J. Petruchik, Honeoye Falls, both of N.Y.

[73] Assignee: Eastman Kodak Company, Rochester, N.Y.

[21] Appl. No.: 201,934

[22] Filed: Feb. 24, 1994

[51] Int. Cl.6 .................. G03B 17/02; G03B 17/38
[52] U.S. Cl. .................... 354/266; 354/288; 354/289.1
[58] Field of Search .............. 354/266, 289.1, 289.11, 354/289.12, 288

[56] References Cited

U.S. PATENT DOCUMENTS 2,085,468  6/1937  Nagel ............................ 354/191
4,483,601  11/1984  Sekida et al. .................. 354/288
5,095,324  3/1992  Alyfuku et al. ............... 354/266 X
5,270,761  12/1993  Kwak .............................. 354/288

Primary Examiner—M. C. Gellner
Assistant Examiner—J. K. Han
Attorney, Agent, or Firm—Roger A. Fields

[57] ABSTRACT

A photographic camera comprises a pair of right-hand and left-hand manually actuatable buttons, located proximate right and left sides of the camera body, for initiating respective camera functions and control means for changing the camera function the right-hand button can initiate to the camera function the left-hand button can initiate and, simultaneously, changing the camera function the left-hand button can initiate to the camera function the right-hand button can initiate. Preferably, one of the right-hand and left-hand buttons is a shutter release button for initiating operation of a camera shutter. Thus, the shutter release button can be selectively tailored for right-hand or left-hand use.

4 Claims, 3 Drawing Sheets

SWITCHABLE CAMERA FUNCTIONS FOR RIGHT-HAND AND LEFT-HAND USER ACTUATED BUTTONS

FIELD OF THE INVENTION

The invention relates generally to the field of photography, and in particular to cameras. More specifically, the invention relates to a camera which permits operation of the shutter release button to be switched from the right side to the left side of the camera body for left-hand use.

BACKGROUND OF THE INVENTION

The vast majority of cameras are intended for right-hand use. That is why the shutter release button is located nearby the right side of the camera body (as viewed from the rear of the camera body).

PROBLEM TO BE SOLVED BY THE INVENTION

Locating the shutter release button nearby the right side of the camera body can make operation of the shutter release button uncomfortable for a left-handed person.

SUMMARY OF THE INVENTION

A photographic camera comprises:
a camera body;
a pair of right-hand and left-hand manually actuatable buttons, located proximate right and left sides of the camera body, for initiating respective camera functions; and
means for changing the camera function the right-hand button can initiate to the camera function the left-hand button can initiate and, simultaneously, changing the camera function the left-hand button can initiate to the camera function the right-hand button can initiate.

Preferably, one of the right-hand and left-hand buttons is a shutter release button for initiating operation of a camera shutter.

ADVANTAGEOUS EFFECT OF THE INVENTION

According to the invention, the shutter release button can be selectively tailored for right-hand or left-hand use.

DETAILED DESCRIPTION OF THE INVENTION

The invention is disclosed as being embodied preferably in a non-single-lens-reflex (NSLR) camera. Because the features of such a camera are generally known, the description which follows is directed in particular only to those elements forming part of or cooperating directly with the disclosed embodiment. It is to be understood, however, that other elements may take various forms known to a person of ordinary skill in the art.

Figure 1:
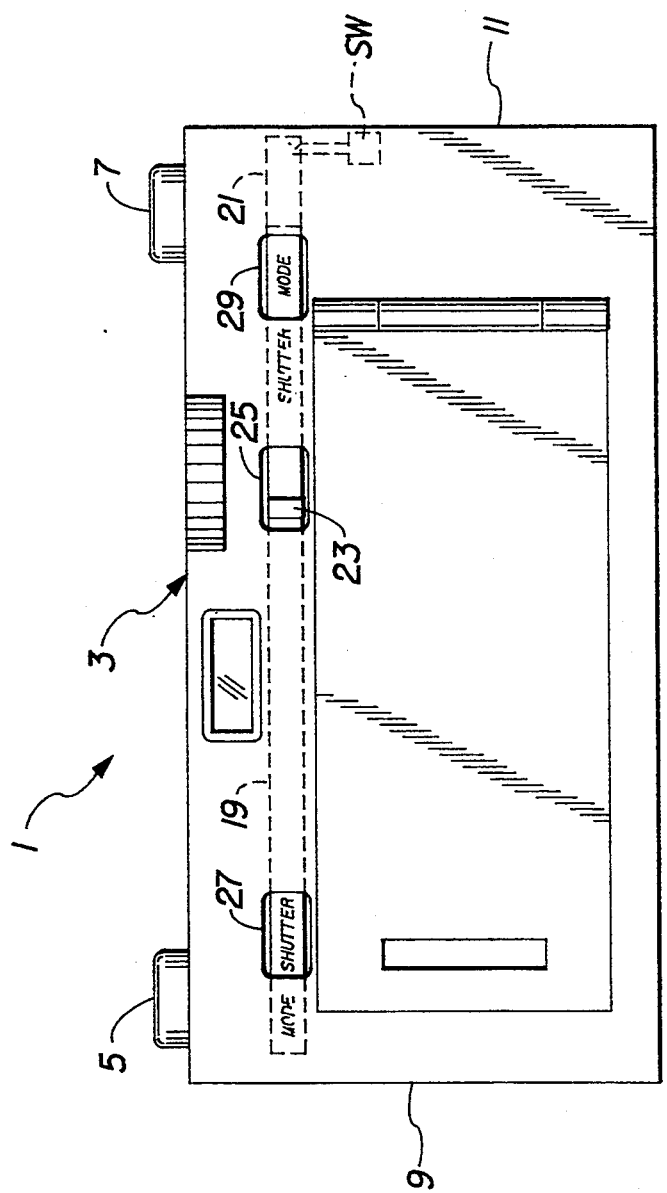
FIG. 1 is a rear elevation view of a camera according to a preferred embodiment of the invention.

Referring now to the drawings, FIG. 1 shows a NSLR camera 1 having a camera body or housing 3 as seen from its back. A pair of identical left-hand and right-hand buttons 5 and 7 are arranged symmetrically with respect to each other proximate right and left sides 9 and 11 of the camera body. As can be appreciated from FIG. 2, the buttons 5 and 7 are manually depressible to close respective normally open switches SW-L and SW-R. The two switches SW-L and SW-R are connected to a conventional microcomputer 13 which, in turn, is connected to a known shutter 15 and known mode means 17. The mode means 17, like the shutter 15, is intended to perform a camera function. For example, the mode means 17 might be a known fill-flash circuit.

Figure 2:
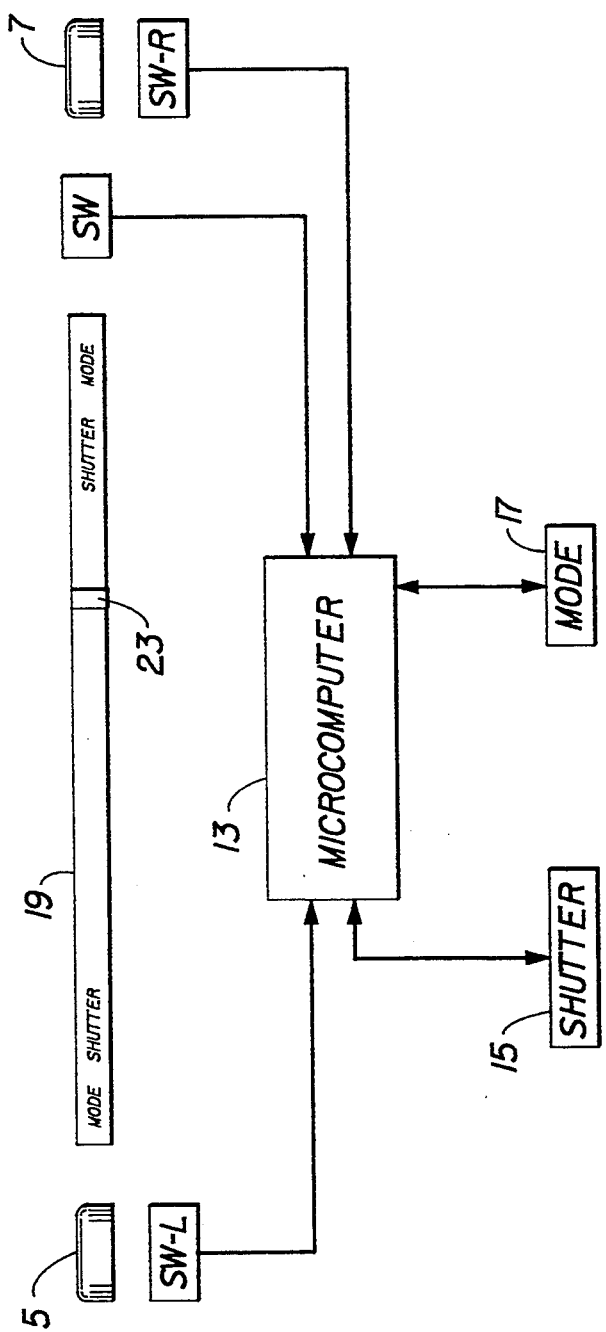
FIG. 2 is a schematic illustration of several components of the camera.

A selector bar 19 is supported inside the camera body 3 for sliding movement along a track or channel 21 to the right in FIGS. 1 and 2 to close a normally open selection switch SW which is connected to the microcomputer 13. The selector bar 19 includes a push tab 23 which protrudes outwardly through a rear opening 25 in the camera body 3, and two sets of imprinted indicia "MODE" and "SHUTTER".

Figure 3:
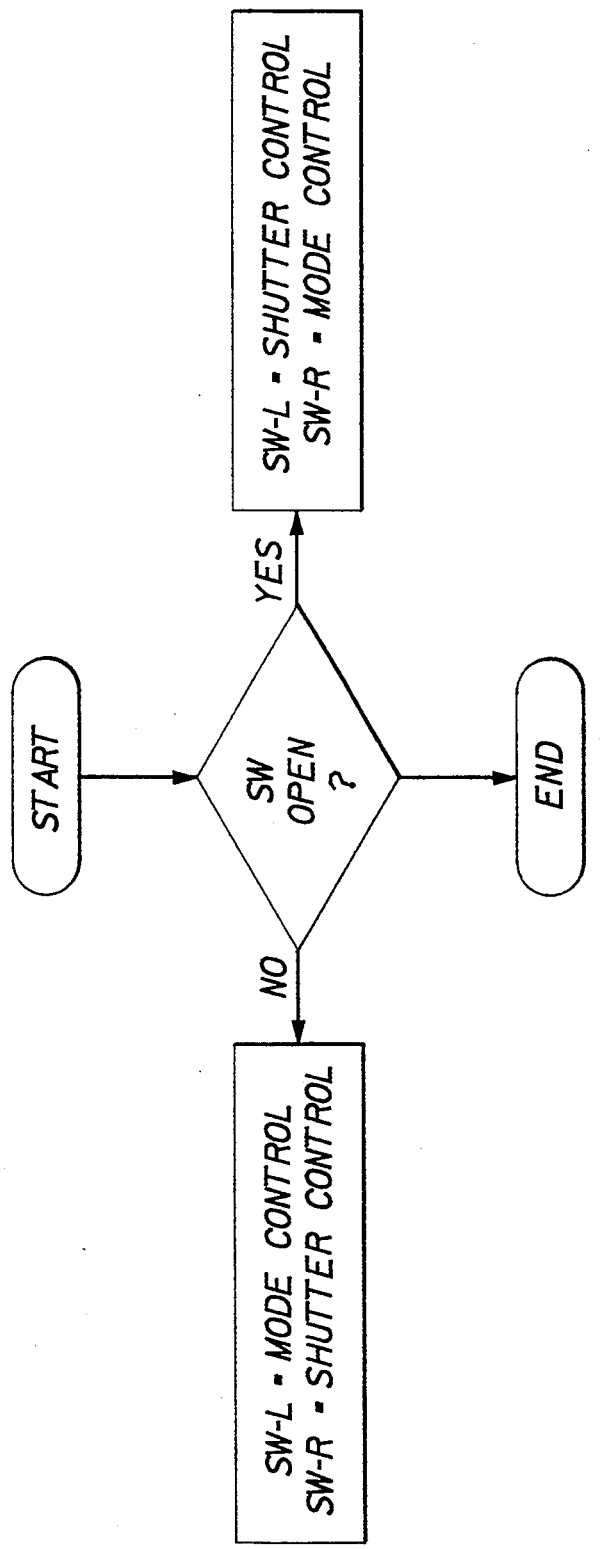
FIG. 3 is a flow chart depicting operation of the invention.

When the selector bar 19 is in a left-most position, illustrated in FIGS. 1 and 2, one of its "SHUTTER" indicia is visible in a rear window 27 in the camera body 3, close to the left-hand button 5, one of its indicia "MODE" is visible in a rear window 29 in the camera body, close to the right-hand button 7, and the selection switch SW is open. As shown in FIG. 3, the open condition of the selection switch SW causes the microcomputer via a typical look-up table to make closing of the switch SW-L initiate operation of the shutter 15 and to make closing of the switch SW-R initiate operation of the mode means 17 to permit use of the mode means, for example, for fill-flash picture-taking, responsive to closing of the switch SW-L. Thus, the left-hand button 5 is the one that is used as a shutter release button and the right-hand button 7 is the one that is used as a mode initiating button.

When the selector bar 19 is in a right-most position, not shown, one of its "SHUTTER" indicia is visible in the rear window 29 (close to the right-hand button 7), one of its indicia "MODE" is visible in the rear window 27 (close to the left-hand button 5), and the selection switch SW is closed. As shown in FIG. 3, the closed condition of the selection switch SW causes the microcomputer via the look-up table to make closing of the switch SW-R initiate operation of the shutter 15 and to make closing of the switch SW-L initiate operation of the mode means 17 to permit use of the mode means, for example, for fill-flash picture-taking, responsive to closing of the switch SW-R. Thus, the right-hand button 7 is the one that is used as a shutter release button and the left-hand button is the one that is used as the mode initiating button.

The invention has been described with reference to a preferred embodiment. However, it will be appreciated that variations and modifications can be effected by a person of ordinary skill in the art without departing from the scope of the invention. For example, in place of the selector bar 19 and the two rear windows 27 and 29, closing and opening of the selection switch SW by manual depression and release of a selection button or manual rotation of a selection knob could be employed to chose which one of the left-hand and right-hand buttons 5 and 7 is to be used as the shutter release button and which one is to be used as the mode initiating button. An LCD panel could provide a visible indication of the selected choice. The selection button or the selection knob could also be used to select other camera modes, for example, various exposure modes, not controlled by one of the left-hand and right-hand buttons 5 and 7. The LCD panel would provide a visible indication of the selected latter mode as well.

PARTS LIST FOR FIGS. 1–3

1. camera
3. camera body
5. left-hand button
7. right-hand button
9. left side of camera body
11. right side of camera body
13. microcomputer
15. shutter
17. mode means
19. selector bar
21. track
23. push tab
25. rear opening
27 & 29. rear windows SW, SW-L, & SW-R. switches

What is claimed is:

1. A photographic camera comprising:
    a camera body;
    a pair of right-hand and left-hand manually movable buttons, located proximate right and left sides of said camera body, for initiating respective different camera functions; and
    means for changing the camera function said right-hand button can initiate to the camera function said left-hand button can initiate and, simultaneously, changing the camera function said left-hand button can initiate to the camera function said right-hand button can initiate.

2. A photographic camera as recited in claim 1, wherein one of said right-hand and left-hand buttons is a shutter release button for initiating operation of a camera shutter.

3. A photographic camera as recited in claim 1, wherein said right-hand and left-hand buttons are arranged symmetrically with respect to each other.

4. A photographic camera as recited in claim 1, wherein said changing means includes a manually movable selector supported for movement in opposite directions for switching the camera functions said right-hand and left-hand buttons can initiate.

\* \* \* \* \*